UNITED STATES PATENT OFFICE 1,970,147

METHOD OF TREATING RECOVERED SULPHUR

Stanley Isaac Levy, Kingston Hill, England

No Drawing. Application January 22, 1931, Serial No. 510,589. In Great Britain March 15, 1930

12 Claims. (Cl. 23—224)

The sulphur obtained by physical methods from deposits of the native element contains generally only small proportions of mineral impurities, usually calcium sulphate or siliceous material. Sulphur recovered by metallurgical or chemical treatment of sulphide minerals, in which the sulphur does not occur in the uncombined condition, on the other hand, is usually associated with more objectionable impurities, such as compounds of the heavy metals and of metalloids. Whilst sulphur obtained from native deposits is generally almost free from arsenic, that recovered from sulphide minerals frequently contains arsenic in considerable quantity, proportions as high as two or even three per cent. being found in extreme cases. Even small quantities of such impurities as arsenic, antimony, or heavy metals may render the sulphur unsuitable for many purposes.

The present invention has for its object to prepare from crude recovered sulphur a highly purified product, equal in quality to the best material obtained from native deposits, by a simple, cheap and highly effective method, and to recover the impurities if present in sufficient quantity in marketable form. It is based on the discovery that the oxides, hydroxides, carbonates, sulphides and similar compounds of many metals, and particularly of the alkali and alkaline earth metals, can be caused to react completely with arsenic and other impurities in sulphur when the latter is in the molten condition, the products of reaction being so readily and completely separable that no trace of impurity is left in the sulphur.

The most suitable reagents for this purpose are the oxides, hydroxides, carbonates, bicarbonates, sulphides and hydrosulphides of the alkali and alkaline earth metals, and particularly of sodium, potassium and calcium. Salts of weak acids formed with strong bases, such as formates, acetates, nitrites, etc., of sodium, potassium and calcium, are also effective. The necessary feature for the reaction is that a metallic compound of basic character should be employed, and I have found that purification may be effected by means of any metallic compound having an alkaline reaction towards litmus.

In accordance with the invention, the purifying agent, generally in the solid powdered condition, but in some cases in solution or in suspension in water, is merely admixed with the molten crude sulphur in such a way as to secure effective contact, and after thorough stirring, which may require in some cases many hours, the mixture allowed to settle.

In one way of carrying out the invention, sodium hydroxide, sulphide, carbonate or bicarbonate is employed in quantity calculated to leave a slight excess over that required to combine with the arsenic, antimony, etc. present. The reagent is added gradually either in the solid condition or as a concentrated aqueous solution to the molten sulphur, with vigorous agitation. The quantity required is that determined by the ratio three atoms of sodium to one atom of arsenic, antimony, etc., as fixed by the equation $$3\ Na_2S + As_2S_3 + 2\ S = 2\ Na_3AsS_4.$$

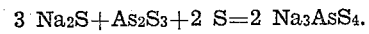

The arsenic sulphide is soluble, and the thioarsenate completely insoluble, in the molten sulphur.

If a compound of an alkaline earth metal is employed, it is best used as a fine suspension or slurry with water. With lime, for example, a suspension of one part calcium hydroxide to five parts of water is very suitable; the equation representing the change is probably $$4\ CaO + As_2S_3 + 6\ S = Ca_3As_2S_8 + CaSO_4,$$

and it is necessary to use lime in the ratio of two molecules to one atom of arsenic, antimony, etc. With calcium sulphide, the ratio required is three molecules to two atoms of arsenic, etc.

When the reagent is added as a solution or suspension in water, it is necessary to supply heat in order that the water may evaporate, and the sulphur remain at a temperature well above its solidifying point; 125–135° is a convenient temperature to maintain. Since it is not desirable to allow the water to accumulate, the reagent should be added gradually, and the molten sulphur kept in vigorous agitation. As some frothing may occur, especially if the sulphur contains chlorine compounds, the vessel should be of ample capacity for the charge. The vessel may be supplied with a jacket or coils or both for heating purposes.

The products of reaction, together with any excess of purifying agent used, and some entangled sulphur, settle out, usually as a sludge or slurry, at the bottom of the container, leaving clear liquid sulphur above. The latter is run off, preferably through a simple filter, which may be of fine sand, asbestos, or metal gauze, or an arrangement of such materials together, or may be an organic fibrous material such as linen, jute, or other suitable textile. The filter serves to retain any foreign matter which has not completely settled out. Alternatively, the whole mixture of sulphur and foreign matter may be drawn off without settling, and caused to pass through the filter, preferably under pressure, by means of a pump, or by air or steam pressure. The sulphur so obtained is of a very high degree of purity, and is practically free from arsenic and "ash".

The residue, which amounts generally to only a fraction of the sulphur treated, may be freed from entangled sulphur by means of a filter or hydraulic press operated above the melting point of sulphur, or by extraction with a suitable solvent, and may be employed as a source of arsenic or arsenic compounds.

When a compound of the alkali metals, e. g., sodium hydroxide, carbonate, bicarbonate or sulphide, has been used as the purifying agent, the arsenic is transformed into a thioarsenate soluble in water, and may be extracted from the residue in that solvent if desired. The aqueous solution may be caused to deposit the thioarsenate by crystallization, or may be treated by means of carbon dioxide or any suitable acid to cause precipitation of yellow arsenic sulphide, with evolution of hydrogen sulphide.

When a compound of an alkaline earth metal, such as lime or calcium sulphide, is employed, the thioarsenate formed is insoluble in water, and is not easily decomposed by acids. Such compounds may be used directly as fungicides or agricultural dressings, for which purpose it is not necessary to remove adherent sulphur.

In place of a single reagent, a mixture of two or more reagents may be employed, or a second reagent may be added to accelerate the extraction of the last traces of impurity when the bulk has been removed by means of a first reagent. The compounds of alkaline earth metals, whilst quite effective for removal of impurities if efficient agitation be employed, remove the last traces somewhat slowly; it is therefore convenient to use a cheap reagent, such as lime, for extracting the great bulk of impurity, and then to remove the last traces by treatment with say sodium hydroxide or sodium sulphide. Similarly, sodium carbonate, which is relatively cheap, is not so rapid in extraction of the last traces of impurity as sodium hydroxide or sulphide. The great bulk of impurity may therefore be extracted by vigorous agitation and addition of a concentrated solution of sodium carbonate or bicarbonate, and the final stages of purification effected by addition of sodium hydroxide or sulphide.

In another method of carrying out the invention, the refining agent in solution or suspension in water is forced into the molten sulphur contained in a pressure-vessel, and brought into most intimate contact therewith by means of agitators or circulating pumps, or other known means. The pressure is maintained at such a point that evaporation of water is prevented. A suitable pressure is 20 to 30 lbs. per square inch gauge pressure, but higher pressures may be used. The higher the pressure, the more rapid is the reaction, but with a pressure of 25 lbs., purification is effected very quickly if the agitation be good.

In this form of the invention, the thio-salts formed are soluble in water, even when a compound of an alkaline earth metal is employed for purification, and in this case it is only necessary to use the reagent in a proportion to give a slight excess over the ratio: 3 molecules of alkaline earth metal compound to 2 atoms of arsenic.

After thorough agitation, the contents of the pressure vessel are allowed to settle. In this case, the molten purified sulphur separates at the bottom and the aqueous liquid at the top. If insoluble impurities, such as silicate or heavy metal compounds, are present, these will usually separate at the interface between the sulphur and the aqueous liquid, though a little may remain suspended in the sulphur. The molten sulphur is allowed to run off under the pressure in the vessel from the bottom through a suitable simple filter to retain any suspended particles. When the sulphur has all run off, the aqueous layer is collected separately, care being taken to avoid undue evaporation by the release of the pressure.

The thio-salts present in the aqueous liquid may be treated after separation by addition of an acid to precipitate the sulphides of arsenic or antimony, if present.

The pressure vessel may be so arranged with an exit at the side that the aqueous layer may be run off after reaction, leaving the molten sulphur still in the vessel. This procedure is convenient if it is desired to wash the molten sulphur after reaction with superheated water or suitable aqueous solution to carry purification to any desired degree.

Both the open pot method and the pressure vessel method of carrying out the invention yield a product chemically pure, and of a very bright color.

I claim:—

1. A process of purifying sulphur consisting in admixing with the sulphur in molten condition a purifying agent in a solid powdered condition, subjecting the molten sulphur and the purifying agent admixed therewith to vigorous agitation, allowing the products of reaction and any excess of purifying agent used to settle out and filtering the liquid sulphur.

2. A process of purifying sulphur consisting in admixing gradually with the sulphur in molten condition a purifying agent together with water, subjecting the molten sulphur and the purifying agent admixed therewith to vigorous agitation, applying heat to remove water by evaporation and to maintain the sulphur above its solidifying point, allowing the products of reaction and any excess of purifying agent to settle out and removing the liquid sulphur by filtration.

3. A process of removing the impurities from sulphur consisting in admixing with the sulphur in molten condition a purifying agent in a solid powdered condition, subjecting the molten sulphur and the purifying agent admixed therewith to vigorous agitation, and separating the mixture of sulphur and impurities by filtration under pressure.

4. A process of removing the impurities from sulphur consisting in admixing gradually with the sulphur in molten condition a purifying agent together with water, subjecting the molten sulphur and the purifying agent admixed therewith to vigorous agitation, applying heat to remove water by evaporation and to keep the sulphur above its solidifying point, and separating the mixture of sulphur and impurities through a filter under pressure.

5. A process of purifying sulphur, consisting in taking the sulphur in a molten condition, admixing with the sulphur a metallic compound which reacts alkaline to litmus, said metallic compound being in the solid condition, and separating the products of the reaction of said compound with the impurities originally present in said sulphur.

6. A method of purifying sulphur, consisting in taking the prepared sulphur in the molten condition and in an open vessel, adding gradually thereto in the presence of water a metallic compound which reacts alkaline to litmus, and admixing the aggregate while maintaining the temperature above the melting point of sulphur to thereby evaporate the water and finally separating the products of the reaction of said compound with the impurities originally present in said sulphur.

7. A method of purifying sulphur, consisting in mixing with the molten sulphur a metallic compound alkaline to litmus to react with the bulk of the impurities present, then adding another such metallic compound to react with the remainder, and finally separating the products of the reaction of said compound with the impurities originally present in said sulphur.

8. A process of purifying sulphur from arsenic and similar impurities which comprises admixing with the sulphur in a molten condition a concentrated solution of a compound reactable with arsenic and having as its metallic component an element selected from the alkali and alkaline earth groups, said compound being added in slight excess of the amount necessary to combine with arsenic and similar impurities present, vigorously agitating the mixture of molten sulphur and said compound and finally separating the products of the reaction of said compound with the impurities originally present in said sulphur.

9. The process of purifying sulphur from arsenic and similar impurities which comprises admixing with the sulphur in a molten condition an aqueous solution of an alkaline purifying agent, vigorously agitating the mixture thus formed to effect combination of said agent with the said impurities, then separating the molten sulphur from the aqueous solution and finally filtering the molten sulphur.

10. The process of purifying sulphur from arsenic and similar impurities which comprises admixing with the sulphur in a molten condition an alkaline purifying agent and vigorously agitating the mixture thus formed to react said agent with said impurities, all while maintaining a superatmospheric pressure in the treatment zone, and finally separating the sulphur from the reaction products of said treatment by filtration.

11. The process of purifying sulphur from arsenic and similar impurities which comprises admixing with the sulphur in a molten condition an aqueous solution of an alkaline purifying agent and vigorously agitating the mixture thus formed to react said agent with said impurities, all while maintaining a superatmospheric pressure in the treatment zone, separating most of the sulphur by decantation from the reaction products and any residual purifying agent, filtering the sulphur so separated, and extracting the residue with water to separate the rest of the sulphur from said reaction products.

12. The process of purifying sulphur from arsenic and similar impurities which comprises admixing with the sulphur in a molten condition an aqueous solution of an alkaline purifying agent and vigorously agitating the mixture thus formed to react said agent with said impurities, all while maintaining a superatmospheric pressure in the treatment zone, extracting the sulphur with water to separate the reaction products and any residual purifying agent, filtering the sulphur and recovering the arsenic content of the aqueous extract.

STANLEY ISAAC LEVY.